(12) United States Patent
Ashton et al.

(10) Patent No.: US 6,434,682 B1
(45) Date of Patent: Aug. 13, 2002

(54) DATA MANAGEMENT SYSTEM WITH SHORTCUT MIGRATION VIA EFFICIENT AUTOMATIC RECONNECTION TO PREVIOUSLY MIGRATED COPY

(75) Inventors: Lyn Lequam Ashton; Stanley Mark Kissinger, both of Pima; Jerry Wayne Pence, Tucson, all of AZ (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 09/672,068

(22) Filed: Sep. 28, 2000

(51) Int. Cl.⁷ .......................... G06F 12/00; G06F 11/00
(52) U.S. Cl. .................. 711/162; 711/161; 711/112; 711/111; 714/6
(58) Field of Search ............... 711/162, 161, 711/165, 112, 111; 714/6

(56) References Cited

U.S. PATENT DOCUMENTS

| | | | |
|---|---|---|---|
| 4,200,928 A | 4/1980 | Allan et al. ............... 364/200 |
| 4,638,424 A | 1/1987 | Beglin et al. ............. 364/200 |
| 4,771,375 A | 9/1988 | Beglin et al. ............. 364/200 |
| 4,876,662 A | 10/1989 | Pence ....................... 364/900 |
| 5,012,415 A | 4/1991 | Boe et al. ............. 364/424.07 |
| 5,197,055 A | 3/1993 | Hartung et al. ............ 369/34 |
| 5,274,799 A | 12/1993 | Brant et al. ............... 395/575 |
| 5,278,970 A | 1/1994 | Pence ....................... 395/425 |
| 5,311,424 A | 5/1994 | Mukherjee et al. ........ 364/401 |
| 5,353,422 A | 10/1994 | Kobayashi et al. ........ 395/425 |
| 5,402,101 A | 3/1995 | Berger et al. .......... 340/286.02 |
| 5,418,971 A | 5/1995 | Carlson .................... 395/800 |
| 5,426,585 A | 6/1995 | Stepper et al. ......... 364/424.03 |
| 5,440,686 A | 8/1995 | Dahman et al. ............ 395/164 |
| 5,475,834 A | * 12/1995 | Anglin et al. .............. 707/203 |
| 5,522,090 A | 5/1996 | Tanaka et al. .............. 395/894 |
| 5,546,557 A | 8/1996 | Allen et al. ................ 395/438 |
| 5,566,348 A | 10/1996 | Dahman et al. ............ 395/838 |

(List continued on next page.)

OTHER PUBLICATIONS

"Fast Second Migrate of Data from On–Line to Removable", IBM Technical Disclosure Bulletin, US vol. No.:36, Issue No.:8, pp.:103–104, Aug. 1, 1993.*

"Sort Process for Migration—Storage to Optical Versus Tape" IBM Technical Disclosure Bulletin, vol. 36 No. 10, Oct. 1993.

"Selectable Migration for Exporting Optical Media" IBM Technical Disclosure Bulletin, vol. 37 No. 06A, Jun. 1994.

"Recalling Migrated Data Sets" IBM Technical Disclosure Bulletin, vol. 26 No. 9, Feb. 1984.

"Automated Cartridge Disposition Promotion (Unload–Least Recently Used to KEEP)" IBM Technical Disclosure Bulletin, vol. 36 No. 08, Aug. 1993.

*Primary Examiner*—Hong Kim
(74) *Attorney, Agent, or Firm*—Dan Hubert & Assoc.

(57) ABSTRACT

A data management system responds to migration requests by automatically invoking a shortcut migration process for suitable candidates. Suitability of candidate data is efficiently evaluated using, among other considerations, the presence or absence of an expedited access indicator for the data which is previously set when the data is recalled from backup storage. In the shortcut migration process, the system automatically reconnects a previously migrated copy of the data object, if available.

13 Claims, 5 Drawing Sheets

U.S. PATENT DOCUMENTS

| | | | |
|---|---|---|---|
| 5,603,003 A | 2/1997 | Akizawa et al. | 395/441 |
| 5,613,082 A | 3/1997 | Brewer et al. | 395/404 |
| 5,646,918 A | 7/1997 | Dimitri et al. | 369/34 |
| 5,680,640 A * | 10/1997 | Ofek et al. | 709/100 |
| 5,740,061 A | 4/1998 | Dewey et al. | 364/478.02 |
| 5,826,043 A | 10/1998 | Smith et al. | 395/281 |
| 5,835,954 A * | 11/1998 | Duyanovich et al. | 711/112 |
| 5,911,150 A | 6/1999 | Peterson et al. | 711/162 |
| 5,966,730 A | 10/1999 | Zulch | 711/162 |
| 5,970,147 A | 10/1999 | Davis | 380/25 |
| 5,980,078 A | 11/1999 | Krivoshein et al. | 364/131 |
| 5,995,960 A | 11/1999 | Lochner et al. | 707/3 |
| 5,999,930 A | 12/1999 | Wolff | 707/8 |
| 6,098,148 A * | 8/2000 | Carlson | 711/100 |
| 6,173,359 B1 * | 1/2001 | Carlson et al. | 711/111 |
| 6,173,360 B1 * | 1/2001 | Beardsley et al. | 711/100 |
| 6,202,124 B1 * | 3/2001 | Kern et al. | 711/100 |
| 6,240,494 B1 * | 5/2001 | Nagasawa et al. | 711/112 |
| 6,247,103 B1 * | 6/2001 | Kern et al. | 711/111 |
| 6,260,124 B1 * | 7/2001 | Crockett et al. | 711/112 |

\* cited by examiner

DATA MANAGEMENT SYSTEM WITH SHORTCUT MIGRATION VIA EFFICIENT AUTOMATIC RECONNECTION TO PREVIOUSLY MIGRATED COPY

BACKGROUND OF THE INVENTION

1. Field of the Invention

The present invention relates to data management systems that use removable data storage media such as magnetic tape. More particularly, the invention includes a data management system that, responsive to a migration request for a particular data object, automatically invokes a shortcut migration process that finds the previously migrated copy of the data object and reconnects to the copy.

2. Description of the Related Art

With the increasing importance of electronic information today, there is a similar increase in the importance of reliable data storage. The market abounds with different means of data storage today, ranging from high-speed, more expensive media such as random access memory (RAM), to slower speed, less expensive products such as magnetic tape. Some advanced, "hierarchical" systems utilize multiple levels of data storage, often high-speed, direct-access storage (such as magnetic disk drive storage) for frequently used data, and relatively lower-speed removable storage media (such as magnetic tape) for infrequently used data. One example of such a system is the IBM System Managed Storage product, which includes the DFSMShsm component.

The movement of data from disk to tape in a hierarchical storage system is called "migration." A single tape might contain hundreds or thousands of migrated datasets. When a migrated dataset is referenced by a user, the dataset is copied back onto the disk in a movement known as "recall." One example of recall appears in IBM Technical Disclosure Bulletin, Vol. 26, No. 9 (February 1984), which is incorporated herein by reference. With recall, the copy left on tape is invalidated in favor of the copy recalled to disk. This usually works well, because any changes to the recalled data will render the copy left on tape worthless; namely, the nature of serially accessible storage media prevents updating the tape copy to match the disk copy.

The DFSMShsm program maintains an inventory of migrated datasets, and uses this inventory to aid in the recall of datasets. The DFSMShsm program also keeps a limited inventory of recalled datasets (which exist on tape but are considered invalid), but only for a brief, fixed period of time. If a recalled dataset becomes inactive, DFSMShsm software re-migrates the recalled dataset back to tape. This re-migration can be time consuming because it requires copying the dataset's entire contents from disk to tape. In cases where the recalled dataset was never changed, this copying is wasted work because the originally migrated data copy (on tape) is the same as the recalled version (on disk).

To address this performance issue, and expedite data re-migration, various approaches have been developed to "reconnect" previously recalled datasets. Broadly, reconnection updates and recreates inventory records rather than again copying data from disk to tape, allowing fast-migration of unchanged recalled data whose migration copy still exists on tape, although flagged as invalid. With one reconnection approach, known as "recall browse," the storage system reconnects datasets back to their tape versions in response to operator-issued commands. The end user must issue a command for each and every dataset to be reconnected. Although this function is beneficial in certain respects, significant user activity is required to evaluate datasets for reconnection, requiring the user to determine if the data object had ever been migrated, determine if that migration copy exists, and if the copy exists, is it identical. Furthermore, the user may be unaware of certain datasets for which reconnection is nonetheless possible. In addition, there is some danger of improperly reconnecting datasets that have changed since recall, and are therefore not suitable for reconnection.

Improving upon the recall browse feature, others developed a reconnection procedure with more automated features. With the more-automated reconnection feature, software supplements the migration process by automatically considering the possibility of reconnecting data. This approach provides the advantage of greater automation, since the end user does not have to manually instigate the recall process, and because more datasets can be considered for reconnection than are possible by manual user command. Although beneficial in some respects, the more-automated approach still suffers from certain limitations. Chiefly, reconnection using the more-automated approach can be time consuming because various input/output operations are required to determine whether a dataset is suitable for reconnection. For instance, time-consuming work is required to determine whether the migration copy exists, and whether it is identical to the recall (disk) copy. In many cases, these operations are wasted, such as when a dataset being considered for reconnection has never been migrated and therefore cannot possibly be a reconnection candidate. When a large number of data objects are being migrated to tape, evaluating each dataset for reconnection can delay the migration by a considerable time.

Consequently, known reconnect procedures are not completely adequate for some applications due to certain unsolved problems.

SUMMARY OF THE INVENTION

Broadly, the present invention concerns a data management system that responds to each migration request for a particular data object by automatically invoking a shortcut migration process that finds a previously migrated copy of the exact data object, if it exists, and automatically reconnects that copy. More specifically, this data management system includes a primary level of storage (such as direct-access storage) and an auxiliary level of storage (such as multiple removable data storage media). An inventory stores metadata identifying data objects contained in the auxiliary level. A catalog includes metadata identifying data objects contained in the primary level, and whether such data objects are reconnectable.

When the data management system receives "recall" requests to copy target data objects from the auxiliary to the primary level, the system performs certain recall operations for each target data object as follows. The system determines whether the target data object meets prescribed future-reconnection criteria, and if so, it updates the catalog to include an expedited access indicator associated with the target data object. The system copies the target data object from the auxiliary level to the primary level. The system also updates the inventory to invalidate the metadata identifying the target data object in the auxiliary level, thereby deactivating the target data object in auxiliary storage. The system also prepares expiration information to be used in determining when to delete the invalidated inventory metadata for the target data object.

When the data management system receives "migration" requests to copy specified data objects from the primary level to the auxiliary level, the system performs certain migration operations for each specified data object as follows. If the catalog does not contain an expedited access indicator associated with the target data object, the system copies content of the specified data object from the primary level to the auxiliary level in a "full" migration operation. On the other hand, if the catalog contains an expedited access indicator associated with the specified data object, the system determines whether restoration of the copy of the specified data object on the auxiliary level is possible. If restoration is not possible, the system performs a full migration. On the other hand, if restoration is possible, the system updates the inventory to restore previously invalidated metadata identifying the copy on the auxiliary level as being the specified data object, instead of re-copying contents of the specified data object from the primary level.

As mentioned above, the system also prepares certain expiration information. Namely, the system establishes a prescribed expiration schedule for metadata identifying auxiliary level copies of recalled data objects based upon access history of the data object. According to this schedule, the system cleans the inventory by removing invalidated metadata. Removing invalidated metadata prevents the inventory size from continually growing. Whenever the inventory is cleaned of metadata associated with certain data objects, the catalog may be updated to clear the expedited access indicators with these data objects. As an alternative, expedited access indicators may be cleared under other circumstances indicating an unusable auxiliary level copy of recalled data. One example occurs when the recalled data object is backed up, since the backup is presumably done to preserve changes in the recalled data object on the primary level.

The foregoing features may be implemented in a number of different forms. For example, the invention may be implemented to provide a method including a shortcut migration operation achieved by efficient, automatic reconnection to previously migrated data. In another embodiment, the invention may be implemented to provide an apparatus such as a data management system, configured to perform shortcut migration according to this invention. In still another embodiment, the invention may be implemented to provide a signal-bearing medium tangibly embodying a program of machine-readable instructions executable by a digital data processing apparatus to perform a shortcut migration operation according to this invention. Another embodiment concerns logic circuitry having multiple interconnected electrically conductive elements configured to perform shortcut migration as described herein.

The invention affords its users with a number of distinct advantages. Basically, the invention saves time by avoiding a full migration to auxiliary storage where possible, since a full migration of a large data object can take hours to complete. Instead of full migration, the invention performs a shortcut migration that restores a deactivated copy of data on auxiliary storage. Advantageously, the invention efficiently determines reconnect candidacy by consulting a catalog that is necessarily consulted for other reasons during reconnection anyway. From the standpoint of overhead, the shortcut migration is beneficial because it has a high likelihood of successful completion. One reason is the expedited access indicator, which helps to quickly exclude data objects for which reconnection is not possible. Also, success of reconnection is aided by preserving invalidated metadata identifying recalled data objects in auxiliary level storage according to a use-based predictive schedule, which likely preserves metadata for future reconnection if needed. As a further advantage, reconnection quickly enables the dataset to be scratched from primary level storage, freeing the typically more expensive primary level storage for storage of other data. As still another benefit, reconnecting datasets instead of copying the datasets to another auxiliary level storage media conserves media and reduces the need to clean and recycle media that become cluttered with deactivated data objects that could have been re-used through reconnection. This invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections

Introduction

Figure 1:
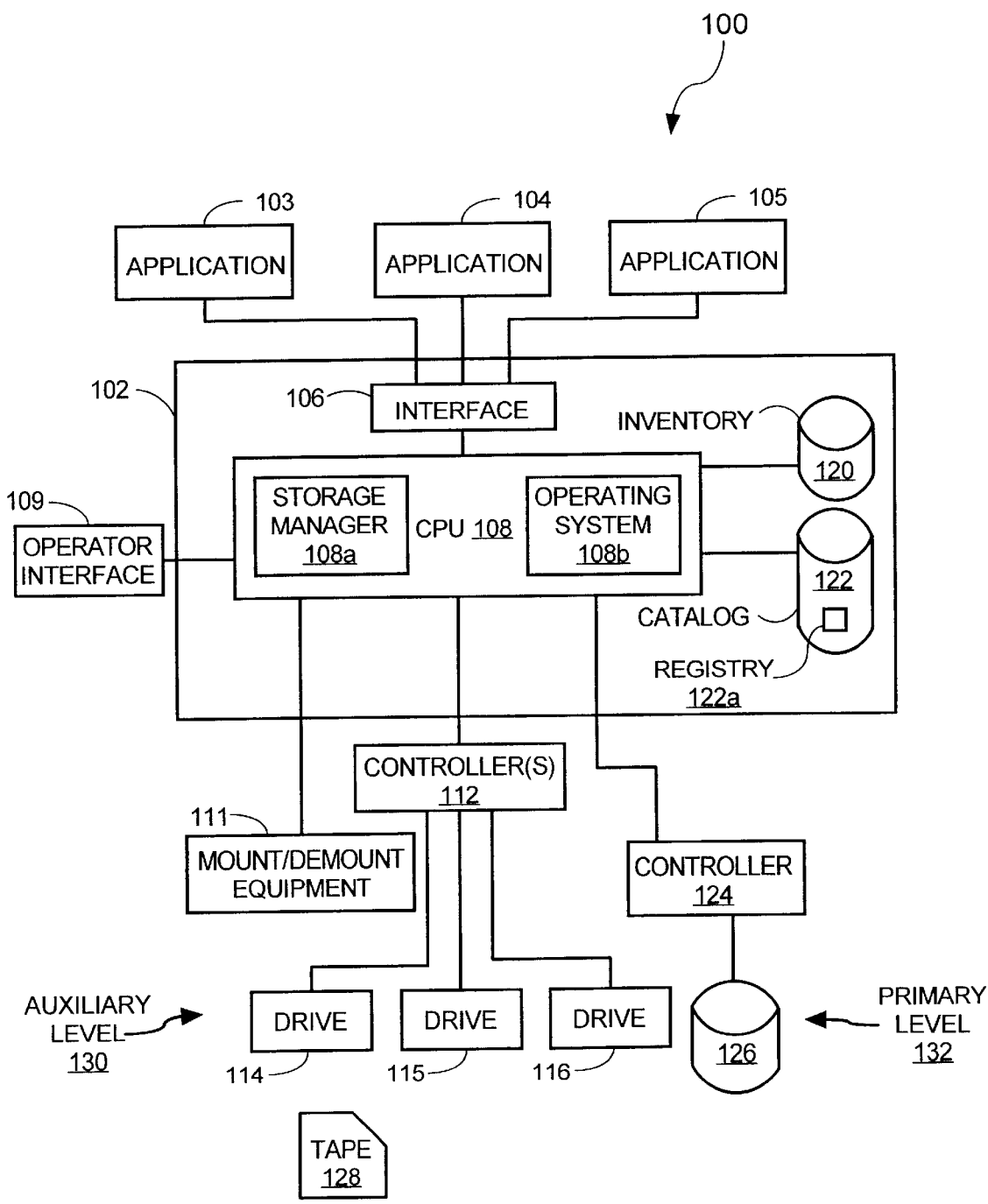
FIG. 1 is a block diagram of the hardware components and interconnections of a data management system, according to the invention.

One aspect of the invention concerns a data management system, which may be embodied by various hardware components and interconnections, with one example being described in FIG. 1. The data management system 100 includes applications 103–105, a subsystem facility 102, operator interface 109, auxiliary level storage 130, and primary level storage 132.

Applications

The applications 103–105 comprise software programs, computer workstations, servers, personal computers, mainframe computers, manually activated operator terminals, or other host processes. In one example, the applications 103–105 represent customers' application programs that utilize storage managed by the subsystem facility 102.

The applications 103–105 communicate with the subsystem facility 102 via one or more interfaces, depicted as the interface 106. The interface 106 provides one or more communications links between the applications 103–105 and a central processing unit (CPU) 108. The interface 106 may utilize wires, busses, backplanes, wireless links, intelligent communications channels, shared memory, computer networks, or other communications links.

Subsystem—CPU

The CPU 108 comprises computer-driven equipment capable of managing operations of the storage levels 130, 132. The CPU 108 may be implemented by a variety of different hardware devices, such as a personal computer, server, computer workstation, mainframe computer, etc. Furthermore, the CPU 108 may even share common hardware with one or more of the applications 103–105.

As illustrated, the CPU 108 includes a storage manager 108*a* and an operating system 108*b*. The storage manager 108a hierarchically manages the storage levels 130, 132, and may comprise a commercially available product such as the IBM brand Data Facility Storage Management Subsystem Hierarchal Storage Manager ("DFSMShsm") product. The operating system 108b may comprise an operating system of suitable sophistication for the subsystem 102, such as the IBM brand MVS operating system. Depending upon the needs of the particular application, the storage manager 108a and operating system 108b may be implemented by separate processing devices, separate processes running on the same machine, or even the same process.

Subsystem—Metadata The subsystem 102 also includes an inventory 120 and catalog 122, which contain various metadata concerning datasets stored in the auxiliary level 130 and primary level 132, respectively. The inventory 120 and catalog 122 comprise data structures that may be implemented by one or more registers, matrices, linked lists, databases, look-up tables, or other suitable data structures. For ease of illustration, these data structures are shown as separate storage areas. The terms "inventory" and "catalog" are utilized to describe the presently illustrated functions without any intended limitation to conventional or specific industry use of so-called "inventories" and "catalogs."

The inventory 120 contains information pertaining to migrated data such as on which tape the data is stored, where the data begins on that tape, when the data was placed there, size of the dataset, access method used to access the dataset, etc. The catalog 122 contains metadata pertaining to data on primary level storage 132 including whether data is reconnectable. The catalog 122 contains a registry 122a of selectively activated expedited access indicators, each corresponding to a different data object. The expedited access indicators, as discussed in greater detail below, indicate whether a shortcut migration process is possibly available (indicated by a binary "one" bit value), or unavailable (indicated by a binary "zero" bit value) for the corresponding data object. The registry 122a may, for example, be implemented in a binary bit map where each bit corresponds to a different data object. In this example, a data object's expedited access indicator is either set or cleared, depending upon whether the binary bit is "one" or "zero" (respectively) in the registry 122a. Although illustrated as a separate entity for ease of illustration, the registry 122a may advantageously be incorporated into the various data objects' entries in the catalog 122, such as by adding an additional flag, column, or other piece of data. This approach is beneficial because the registry data can be easily accessed with nominal input/output overhead by scheduling registry access when the catalog 122 is normally consulted for other reasons.

Data Storage

As mentioned above, the system 100 includes multiple levels of data storage, exemplified by an auxiliary level 130 and a primary level 132. In the illustrated example, the auxiliary level 130 comprises multiple read/write drives 114–116, each comprising an electronic machine to conduct read/write operations with a storage medium in removable attachment to the storage drive. As one example, the drives 114–116 may comprise magnetic tape drives such as IBM model 3590-E1A tape drives, and they may reside in automated tape libraries. In this example, the storage media comprise removable magnetic tapes (such as 128) housed in cartridges. Although magnetic tape storage is used to illustrate the invention (with no intended limitation), the drives 114–116 may also be implemented by Write-Once-Read-Many ("WORM") and other storage media. The primary level 132 comprises direct access storage, which is implemented as disk drive storage 126 in this example.

Controllers 112 manage low level operations of the tape drives 114–116 under direction of the CPU 108. For instance, the controllers 112 may direct read/write heads to carry out Read and Write operations upon tapes mounted to the drives 114–116. The controllers 112 may comprise one or more microcontrollers, for example. Similarly, a controller 124 manages operations of the DASD 126 under direction of the CPU 108.

The system 100 may also include automated mount/demount equipment 111. The equipment 111 serves to mount tapes into the drives 114–116 and demount tapes from the drives 114–116. In one example, such equipment may be provided by separate cartridge loaders or other equipment local to each drive. In another example, the equipment 111 may be provided by a robotic arm or other component with universally access to all drives 114–116. In still another alternative, a human operator may be employed to carry out tape mount/demount operations.

Operator Interface

As mentioned above, the subsystem facility 102 is also coupled to an operator interface 109. The operator interface 109 includes components such as a computer terminal, keyboard, video monitor, computer mouse, manual controls such as dials, buttons, switches, etc. The operator interface 109 permits a system administrator or other human operator to alter the operation of the subsystem facility 102 by entering commands, changing operating parameters, etc.

Exemplary Digital Data Processing Apparatus

Figure 2:
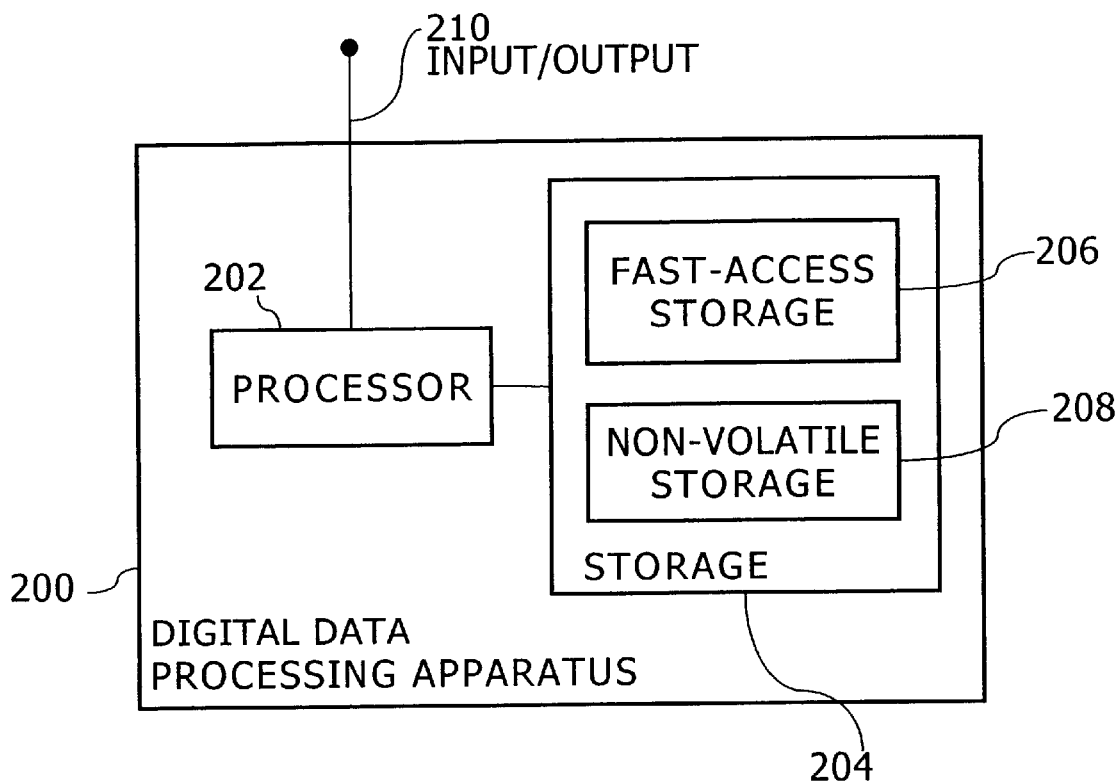
FIG. 2 is a block diagram of a digital data processing machine according to the invention.

As mentioned above, the CPU 108 may be implemented in various forms. As one example, the CPU 108 may comprise a digital data processing apparatus, as exemplified by the hardware components and interconnections of the digital data processing apparatus 200 of FIG. 2.

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the functions of the CPU 108. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

Having described the structural features of the present invention, the method aspect of the present invention will now be described. The method aspect of this invention concerns a procedure for operating a data management system where, responsive to a migration request for a particular data object, the system automatically invokes a shortcut migration process that attempts to locate a previously migrated copy of the data object and automatically reconnects to a located copy.

Although the present invention has broad applicability to data storage systems, the specifics of the hardware structure that has been described is particularly suited for multilevel data management systems with fast-access, disk-drive storage constituting one level, and long-term removable tape media storage constituting another level. Accordingly, the explanation that follows will emphasize such an application of the invention without any intended limitation.

Signal-Bearing Media

In the context of FIG. 1, the method aspect of this invention may be implemented, for example, by operating the storage manager 108a, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a shortcut migration process for a data object by efficiently and automatically reconnecting to a previously migrated copy of the data object.

Figure 3:
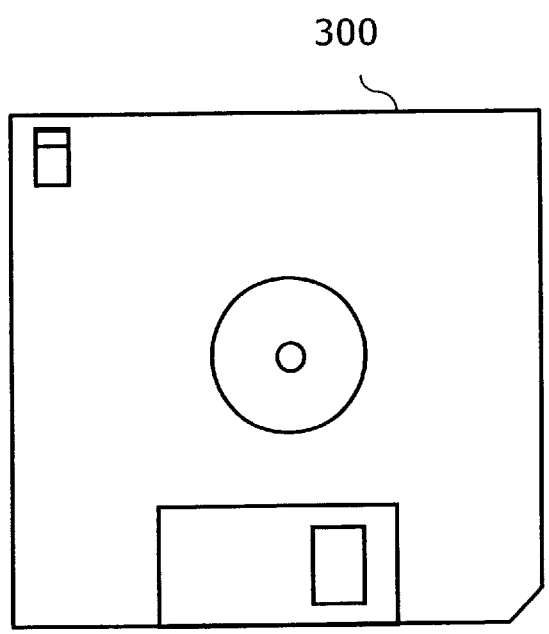
FIG. 3 shows an exemplary signal-bearing medium according to the invention.

This signal-bearing media may comprise, for example, RAM (not shown) contained within the CPU 108, as represented by the fast-access storage 206. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional "hard drive", redundant array of inexpensive disks ("RAID"), or another direct access storage device ("DASD")), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the CPU 108, and is configured to perform operations to implement the method of the invention. The logic circuitry may be implemented using many different types of circuitry, as discussed above.

Recall

Figure 4:
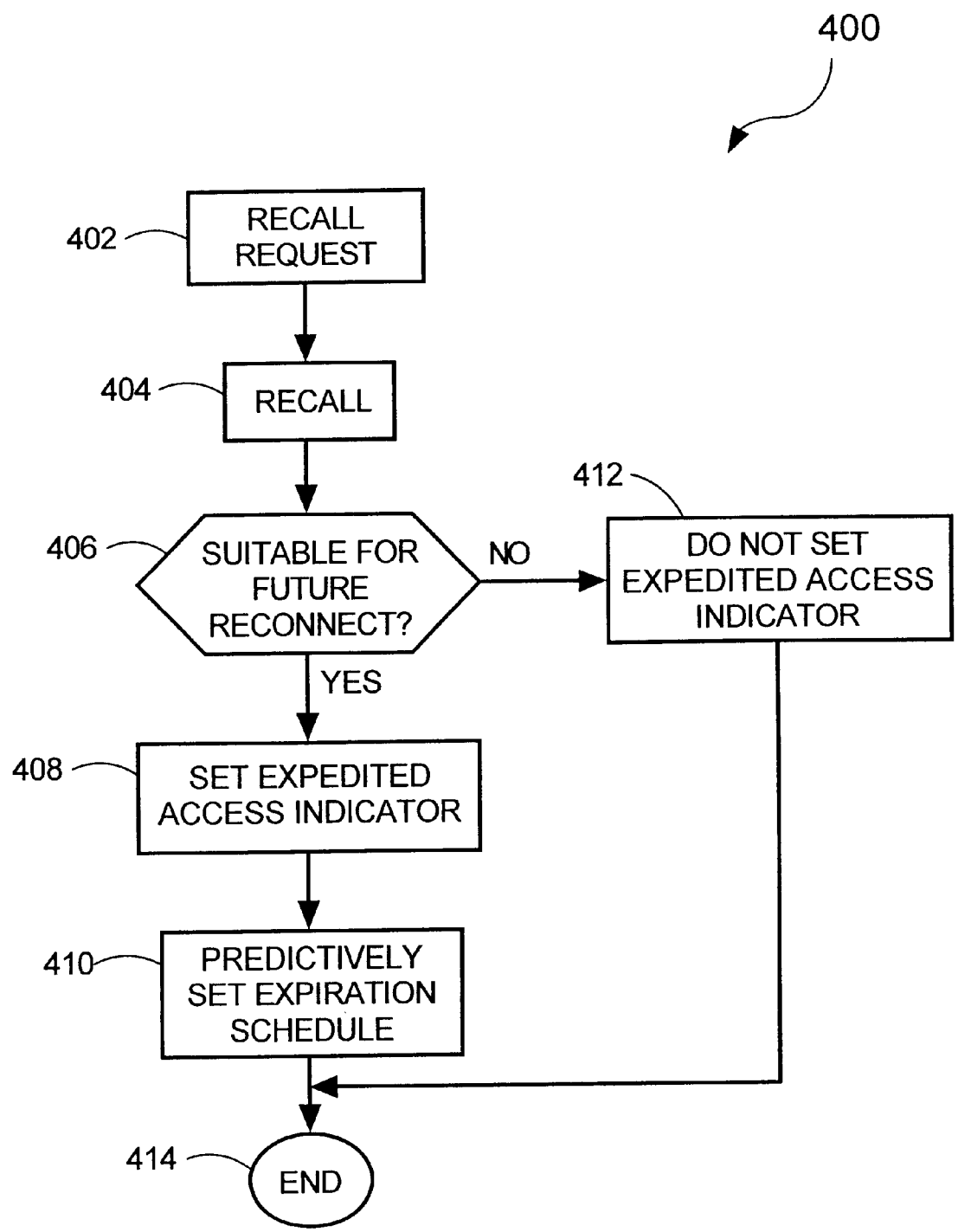
FIG. 4 is a flowchart of a recall procedure according to the invention.

FIG. 4 shows a sequence 400 to illustrate a recall procedure according to the invention. Although data objects are originally stored in the primary level 132, they may be migrated to the auxiliary level 130 after some period of non-use. Broadly, the recall sequence 400 copies a data object from the auxiliary level 130 back to the primary level 132 in response to demand for that data object. Advantageously, the present invention includes additional steps during recall in order to allow more efficient future reconnection of the data object should a subsequent migration of the unchanged data object be necessary.

For ease of explanation, but without any intended limitation, the example of FIG. 4 is described in the context of the data management system 100 described above. In this example, the operations 400 are performed by the storage manager 108a. The sequence 400 begins (step 402) when the storage manager 108a receives a request to "recall" a target data object. Depending upon the application, "data objects" may comprise any appropriate data unit such as one or more datasets, records, files, pages, volumes, tracks, combinations of the foregoing, etc. The recall request is received from one of the applications 103–105 (such as a customer application wishing to browse a data object stored on tape), or from an internal task of the subsystem facility 102 such as a task being executed by the storage manager 108a or operating system 108b.

After step 402, the storage manager 108a responds by recalling the target data object from tape (step 404). In the illustrated embodiment, the recall step 404 is performed according to conventional procedures, such as the recall procedures implemented by the IBM brand DFSMShsm software. Namely, the storage manager 108a consults the inventory 120 to locate the target data object on tape, and then copies the data object to the disk-drive storage 126. The recall operation also updates the inventory 120 by invalidating metadata that identifies the target data object in the auxiliary level 130. More particularly, the storage manager 108a deactivates the copy of the target data object on tape by indicating in the inventory 120 metadata that the data object has been recalled. The metadata for this data object still exists in the inventory 120, albeit in invalidated form.

After step 404, the storage manager 108a asks whether the target data object is unsuitable for future reconnection (step 406). The grounds for unsuitability may be specified during an earlier initialization operation performed upon installation of the system 100, post-initialization customer inquiry, subsequent reconfiguration by an operator via the interface 109, etc. In the illustrated example, step 406 assumes that data objects are suitable for reconnection unless any reconnection-disqualifying criteria are met. These criteria may include various characteristics depending upon the application, where these characteristics serve to identify data object types that are likely to fail reconnection or cause difficulties to the reconnect procedure. Some exemplary disqualifying criteria include:

1. Target data objects that span multiple tapes (depending upon implementation).
2. The subsystem facility 102 has received operator input opting against reconnection generally, or of reconnection of a particular data object.
3. Data objects that are too small to yield any measurable gain in efficiency by reconnecting.

Of course, the disqualifying criteria may change depending upon the particular hardware/software used in the system 100, and the foregoing are given as mere examples. If any of the reconnection disqualifying criteria are met, the storage manager 108a does not set an expedited access indicator bit in the registry 122a for the data object (step 412), and the routine 400 ends (step 414).

On the other hand, if the target data object does not fail any reconnection disqualifying criteria, step 406 advances to step 408 where the storage manager 108*a* sets the expedited access indicator bit in the registry 122*a*. Advantageously, the registry 122*a* is located within the catalog 122, so that setting of the expedited access indicator bit does not significantly incur input/output costs, since access of the catalog 122 is required nonetheless during the conventional recall step 404 to show the presence of the recalled data object in the primary level 132.

After step 408, the storage manager 108*a* predictively establishes an expiration schedule for the invalidated inventory metadata associated with the target data object (step 410). Namely, the storage manager 108*a* considers the access history of the data object, and tailors its expiration schedule so that the invalidated data object remains in the inventory 120 for a sufficient time to anticipate the possibility of future reconnection operations. The expiration schedule may be fixed by setting a timer referenced by the storage manager 108*a*, configuring lookup table, setting hardware interrupt, or any other useful technique. As a more specific example, data objects metadata may be set to expire according to Equation 1, shown below.

$$\text{deletion date} = \text{recall date} + i + v \quad [1]$$

where:

deletion date=the date of planned expiration for that data object's metadata in the inventory 120.

recall date=the date that the data object was recalled to the primary level 132 from auxiliary level storage 130.

$i$=the number of days that the data object was previously inactive on primary level 132 storage before it was last migrated.

$v$=an installation-specified number of days, which is set in order to allow a storage administrator to balance factors such as the extra storage cost needed for a larger inventory versus slower migration performance, etc.

After step 410, the recall procedure 400 is complete, and the routine 400 ends in step 414.

Migration/Reconnect

Figure 5:
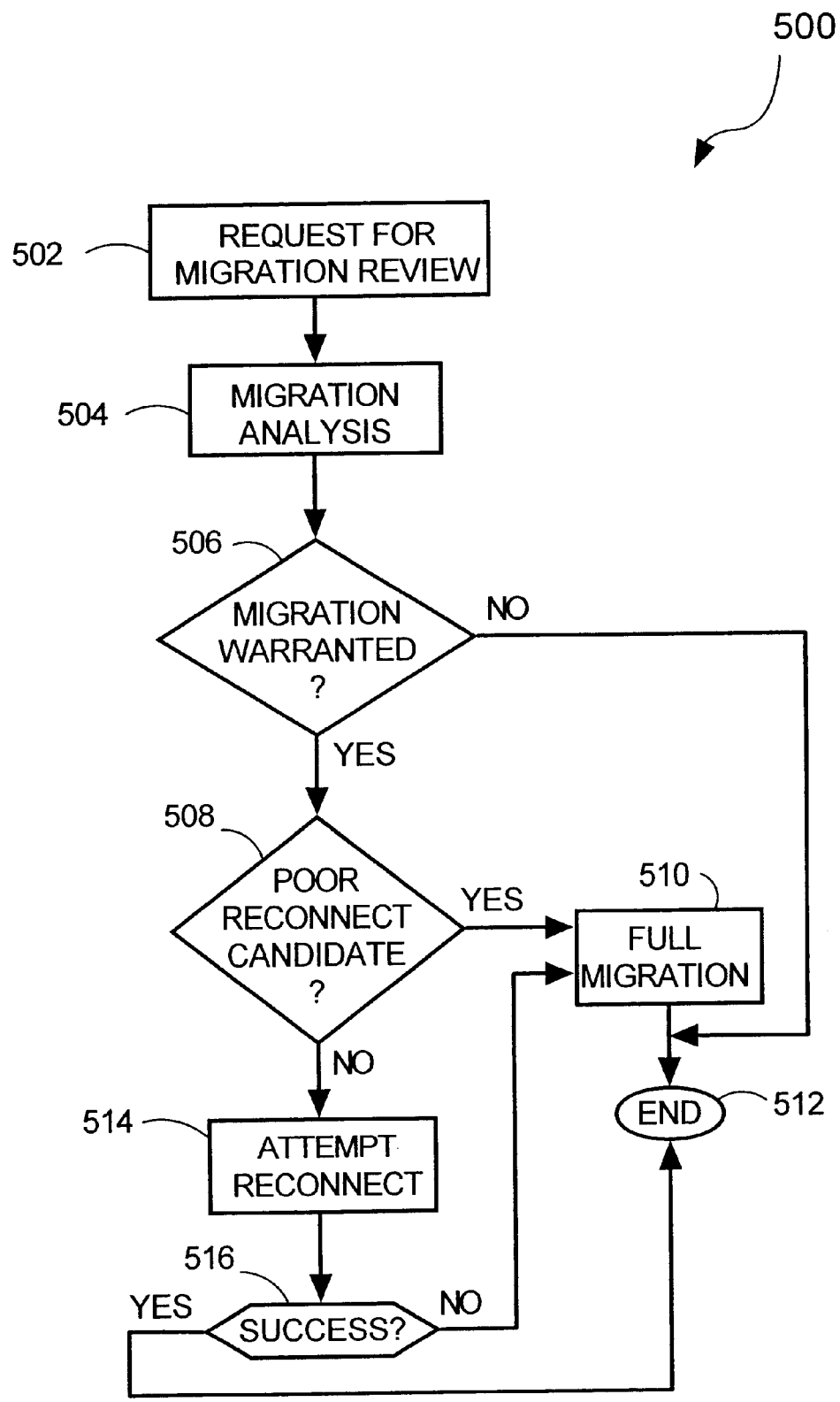
FIG. 5 is a flowchart of a data analysis and migration procedure according to the invention.

FIG. 5 shows a sequence 500 to illustrate a procedure for analysis and possible migration according to the invention. Broadly, migration is performed in order to move data objects from the primary level 132 to the auxiliary level 130, presumably after some period of non-use, satisfaction of migration criteria, or other reasons. The sequence 500 determines whether migration is warranted, and if so, carries out the appropriate type of migration. In some cases, a data object to be migrated has previously been migrated. Advantageously, in cases of such re-migration, the present invention's migration procedure performs a shortcut migration ("reconnection") if possible, thereby reactivating the data copy on auxiliary storage instead of copying the contents of the data object from the primary level to the auxiliary level.

For ease of explanation, but without any intended limitation, the example of FIG. 5 is described in the context of the system 100 described above. In this example, the operations 500 are performed by the storage manager 108*a*. The sequence 500 begins when the storage manager 108*a* receives a request to analyze a specified data object for possible migration (step 502). The migration analysis request is received from one of the applications 103–105, or from an internal task of the subsystem 102 such as a hierarchical storage management process executed by the storage manager 108*a*.

Responsive to step 502, the storage manager 108*a* applies a migration analysis to the specified data object (step 504). This analysis determines if migration is warranted, based upon considerations such as the length of time that the data object has been present in primary level storage, the frequency or recency of use of the data object in primary level storage, whether the data object is a type that is not compatible with migration, whether the dataset is scheduled for an imminent backup, etc. In the illustrated embodiment, the foregoing analysis may be performed according to conventional procedures, such as the migration analysis implemented by the IBM brand DFSMShsm software. However, in step 504 the storage manager 108*a* performs a new operation by reviewing the specified data object's expedited access indicator bit in the registry 122*a*. Advantageously, since the registry 122*a* is located within the catalog 122, and the catalog 122 is necessarily accessed to consider characteristics of the data object in primary level storage 132 as discussed above, as part of conventional migration analysis, review of the expedited access indicator bit does not significantly incur input/output costs. In this respect, the registry 122*a* may be specifically placed in the catalog 122 in a location that necessarily incurs access during the previously discussed analysis of step 504. As an additional benefit, the registry's (optional) bitmap format further minimizes input/output costs because of its ease of access.

As recognized by the inventors, the conservation of input/output operations is important. If the system had to manually determine at migration time which of the eligible migration candidates were also reconnection candidates, enough overhead could be spent such that the data movement processing time saved by reconnecting a few datasets would be overshadowed by the extra processing time spent evaluating each and every eligible migration candidate to see if it were also a candidate for reconnection. The use and placement of the registry 122*a* directly solves this problem.

If migration is warranted, step 506 advances to step 508, where the storage manager 108*a* asks whether the specified data object is a poor reconnect candidate. Namely, the storage manager 108*a* first asks whether the specified data object's expedited access indicator in the registry 122*a* is cleared meaning that the data object is a poor reconnect candidate. If the registry entry is cleared, reconnection is not desirable because the data object initially did not meet the future-reconnection criteria (step 406, FIG. 4), or because the indicator bit was subsequently cleared for some reason (as discussed below). In either case, reconnection is not desirable and probably not possible, and the storage manager 108*a* proceeds to perform full migration in step 510. With full migration, contents of the data object are copied from the primary level 132 to the auxiliary level 130. After step 510, the routine 500 ends in step 512.

In contrast, if the specified data object is a reconnection candidate, the storage manager 108*a* attempts reconnection in step 514. Success of the reconnection depends upon whether the previous migrated data copy is still present on tape, this copy still matches the recalled copy on DASD 126, and the tape copy is still sufficiently identified by metadata (albeit, invalidated) in the inventory 120. After step 514, step 516 advances to step 510 (full migration) if reconnection failed. Alternatively, step 514 proceeds to step 512 (end) if reconnection succeeded.

Cleanup

Figure 6:
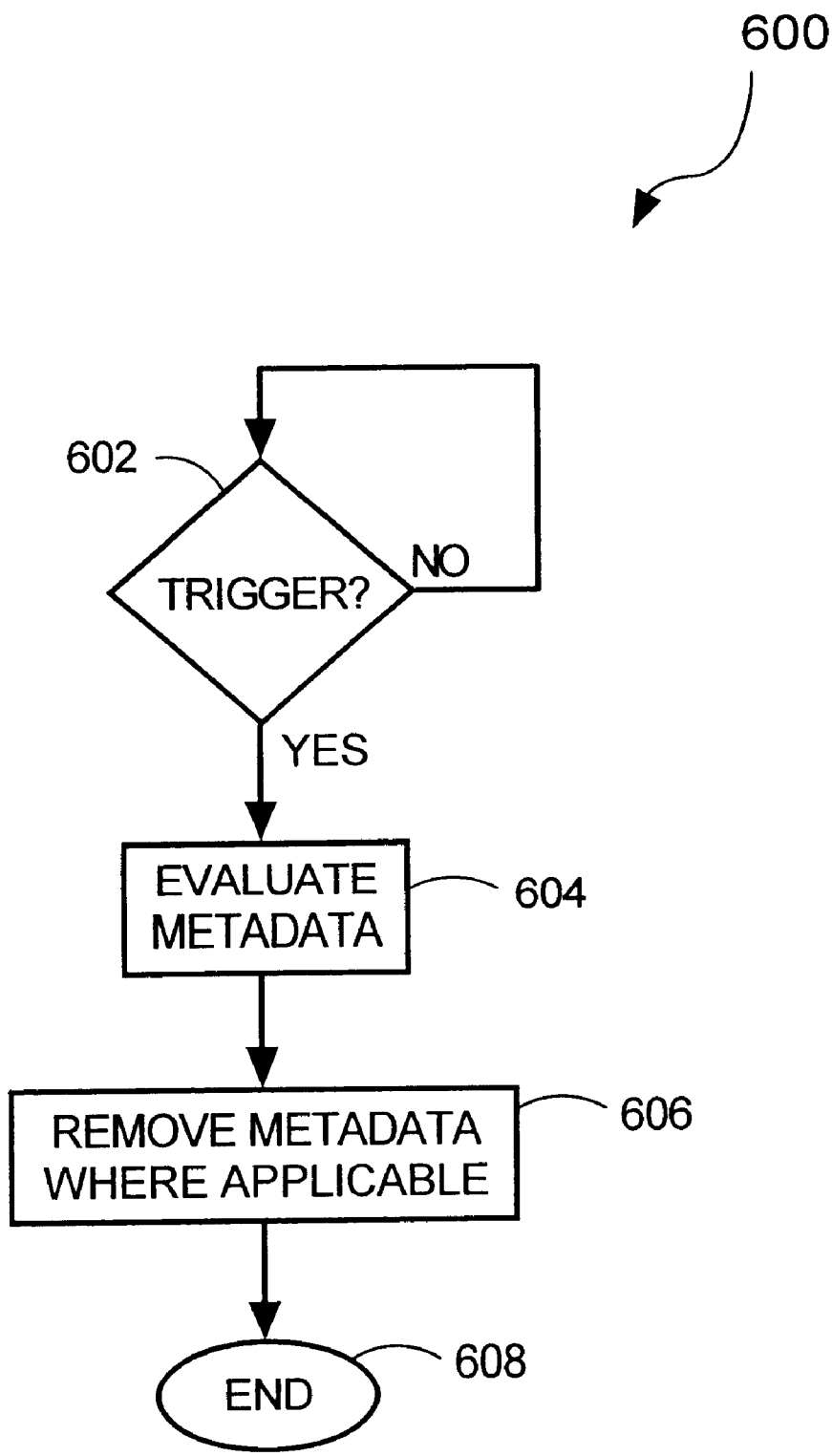
FIG. 6 is a flowchart of a cleanup procedure according to the invention.

FIG. 6 shows a sequence 600 illustrating a cleanup procedure according to the invention. As mentioned above, step 410 (FIG. 4) predictively establishes an expiration schedule for invalidated inventory metadata associated with a data object that has been recalled from tape. The sequence 600 is performed in order to delete invalidated metadata in accordance with this expiration schedule. For ease of explanation, but without any intended limitation, the example of FIG. 6 is described in the context of the storage system 100 described above. In this example, the sequence 600 is performed by the storage manager 108a.

The sequence 600 begins in step 602, where the storage manager 108a determines whether a predetermined trigger has occurred. The triggers are designated during an earlier initialization operation, which may be performed upon installation of the system 100, post-initialization customer inquiry, subsequent reconfiguration by an operator via the interface 109, etc. The trigger comprises one or more scheduled non-periodic times, periodic times, storage events, occurrences in the subsystem 102, or other predetermined stimuli. There may be one or multiple different triggers, depending upon the desired schedule for evaluating metadata. As an example, the trigger 602 may be set to occur at 1:00 a.m. every Sunday until done, or it might perform from 8:00 p.m. to 10:00 p.m. every day and start over at the beginning whenever it completes a full pass through the inventory.

When step 602 is satisfied, the storage manager 108a evaluates the contents of the inventory 120 to identify metadata the meets the predictive expiration schedule of step 410 (FIG. 4). Then, the storage manager removes expired metadata from the inventory 120 (step 606). Optionally, in step 606 the storage manager 108a may also clean the registry 122a by clearing the expedited access indicators for data objects whose metadata has expired. Alternatively, to conserve input/output operations, the task of clearing expedited access indicators in step 606 may be skipped; in this case, step 516 (FIG. 5) alone will determine the feasibility of reconnect for any data objects whose metadata has expired without their expedited access indicators being cleared. After step 606, the routine 600 ends in step 608.

Clearing of Expedited Access Indicators

In addition to clearing expedited access indicators in step 606 (FIG. 6), the storage manager 108a may clear expedited access indicators under other circumstances. For example, whenever the system 100 performs a backup of a data object from the primary level 132, it may be assumed that the data object has diverged from any previously migrated copy on tape, and the expedited access indicator for that data object may be cleared accordingly. Some other exemplary circumstances include detection of changes occurring to a recalled primary level data object, changes to metadata of primary level data objects, etc.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. An automated, computer-driven method for operating a data management system comprising direct-access storage constituting a primary level of storage and multiple removable data storage media constituting an auxiliary level of storage, the system including an inventory containing metadata identifying data objects contained in the auxiliary level, comprising operations of:

responsive to each recall request comprising a request to copy a target data object from the auxiliary level to the primary level, performing recall operations comprising:

determining whether the target data object meets prescribed future-reconnection criteria, and if so, updating a catalog to include an expedited access indicator associated with the target data object;

copying the target data object from the auxiliary level to the primary level;

updating the inventory to invalidate metadata identifying the target data object in the auxiliary level;

responsive to migration requests each comprising a request to copy a specified data object from the primary level to the auxiliary level, performing migration operations comprising:

determining whether the catalog contains an expedited access indicator associated with the specified data object;

if the catalog contains an expedited access indicator associated with the specified data object, determining whether restoration of a copy of the specified data from the auxiliary level is possible, and if restoration is not possible, performing a full migration comprising copying contents of the specified data object from the primary level to the auxiliary level;

if restoration is possible, performing a shortcut migration comprising updating the inventory to restore invalidated metadata identifying the specified data object in the auxiliary level without copying the specified data object from the primary level to the auxiliary level; and if the catalog does not contain an expedited access indicator associated with the specified data object, copying content of the specified data object from the primary level to the auxiliary level.

2. The method of claim 1, the operations further comprising:

using historical data to predict future migration requests for data objects having invalidated metadata; and preserving invalidated metadata in the inventory for sufficient time to satisfy at least some of the predicted future migration requests.

3. The method of claim 1, where the operations further comprise:

according to a prescribed expiration schedule, cleaning the inventory by removing invalidated metadata.

4. The method of claim 2, further responsive to each recall request comprising a request to copy a target data object from the auxiliary level to the primary level, establishing the prescribed expiration schedule for inventory metadata identifying the target data object based upon access history of the target data object.

5. The method of claim 1, where the operation of determining whether the target data object meets the prescribed future-reconnection criteria, and if so, updating the catalog to include the expedited access indicator comprises:

updating the catalog to include the expedited access indicator associated with the target data object unless the target data object meets certain disqualifying criteria.

6. A signal-bearing medium tangibly embodying a program of machine-readable instructions executable by a digital processing apparatus to perform operations to manage a data management system comprising direct-access storage constituting a primary level of storage and multiple removable data storage media constituting an auxiliary level of storage, the system including an inventory containing metadata identifying data objects contained in the auxiliary level, the operations comprising:

responsive to each recall request comprising a request to copy a target data object from the auxiliary level to the primary level, performing recall operations comprising:

determining whether the target data object meets prescribed future-reconnection criteria, and if so, updating a catalog to include an expedited access indicator associated with the target data object;

copying the target data object from the auxiliary level to the primary level;

updating the inventory to invalidate metadata identifying the target data object in the auxiliary level;

responsive to migration requests each comprising a request to copy a specified data object from the primary level to the auxiliary level, performing migration operations comprising:

determining whether the catalog contains an expedited access indicator associated with the specified data object;

if the catalog contains an expedited access indicator associated with the specified data object, determining whether restoration of a copy of the specified data from the auxiliary level is possible, and if restoration is not possible, performing a full migration comprising copying contents of the specified data object from the primary level to the auxiliary level;

if restoration is possible, performing a shortcut migration comprising updating the inventory to restore invalidated metadata identifying the specified data object in the auxiliary level without copying the specified data object from the primary level to the auxiliary level; and if the catalog does not contain an expedited access indicator associated with the specified data object, copying content of the specified data object from the primary level to the auxiliary level.

7. The medium of claim 6, the operations further comprising:

using historical data to predict future migration requests for data objects having invalidated metadata;

preserving invalidated metadata in the inventory for sufficient time to satisfy at least some of the predicted future migration requests.

8. The medium of claim 6, where the operations further comprise:

according to a prescribed expiration schedule, cleaning the inventory by removing invalidated metadata.

9. The medium of claim 7, the operations further comprising, responsive to each recall request comprising a request to copy a target data object from the auxiliary level to the primary level, establishing the prescribed expiration schedule for inventory metadata identifying the target data object based upon access history of the target data object.

10. The medium of claim 6, where the operation of determining whether the target data object meets the prescribed future-reconnection criteria, and if so, updating the catalog to include the expedited access indicator comprises:

updating the catalog to include the expedited access indicator associated with the target data object unless the target data object meets certain disqualifying criteria.

11. A logic circuit of multiple interconnected electrically conductive elements configured to perform operations to manage a data management system comprising direct-access storage constituting a primary level of storage and multiple removable data storage media constituting an auxiliary level of storage, the system including an inventory containing metadata identifying data objects contained in the auxiliary level, the operations comprising:

responsive to each recall request comprising a request to copy a target data object from the auxiliary level to the primary level, performing recall operations comprising:

determining whether the target data object meets prescribed future-reconnection criteria, and if so, updating a catalog to include an expedited access indicator associated with the target data object;

copying the target data object from the auxiliary level to the primary level;

updating the inventory to invalidate metadata identifying the target data object in the auxiliary level;

responsive to migration requests each comprising a request to copy a specified data object from the primary level to the auxiliary level, performing migration operations comprising:

determining whether the catalog contains an expedited access indicator associated with the specified data object;

if the catalog contains an expedited access indicator associated with the specified data object, determining whether restoration of a copy of the specified data from the auxiliary level is possible, and if restoration is not possible, performing a full migration comprising copying contents of the specified data object from the primary level to the auxiliary level;

if restoration is possible, performing a shortcut migration comprising updating the inventory to restore invalidated metadata identifying the specified data object in the auxiliary level without copying the specified data object from the primary level to the auxiliary level; and if the catalog does not contain an expedited access indicator associated with the specified data object, copying content of the specified data object from the primary level to the auxiliary level.

12. A data storage system, comprising:

a primary storage level comprising direct-access storage media;

an auxiliary storage level comprising removably mounted storage media;

an inventory containing metadata identifying data objects contained in the auxiliary level;

a storage manager, configured to perform operations to manage access of the primary and auxiliary storage levels, the operations comprising:

responsive to each recall request comprising a request to copy a target data object from the auxiliary level to the primary level, performing recall operations comprising:

determining whether the target data object meets prescribed future-reconnection criteria, and if so, updating a catalog to include an expedited access indicator associated with the target data object;

copying the target data object from the auxiliary level to the primary level;

updating the inventory to invalidate metadata identifying the target data object in the auxiliary level;

responsive to migration requests each comprising a request to copy a specified data object from the primary level to the auxiliary level, performing migration operations comprising:

determining whether the catalog contains an expedited access indicator associated with the specified data object;

if the catalog contains an expedited access indicator associated with the specified data object, determining whether restoration of a copy of the specified data from the auxiliary level is possible, and if restoration is not possible, performing a full migration comprising copying contents of the specified data object from the primary level to the auxiliary level;

if restoration is possible, performing a shortcut migration comprising updating the inventory to restore invalidated metadata identifying the specified data object in the auxiliary level without copying the specified data object from the primary level to the auxiliary level; and if the catalog does not contain an expedited access indicator associated with the specified data object, copying content of the specified data object from the primary level to the auxiliary level.

13. A data storage system, comprising:

primary storage means for providing direct-access storage and retrieval of data;

auxiliary storage means providing storage and retrieval of data upon removably mounted storage media;

inventory means for storing metadata identifying data objects contained in the auxiliary storage means;

storage managing means for managing access of the primary and auxiliary storage means by:

responsive to each recall request comprising a request to copy a target data object from the auxiliary storage means to the primary storage means, performing recall operations comprising:

determining whether the target data object meets prescribed future-reconnection criteria, and if so, updating a catalog to include an expedited access indicator associated with the target data object;

copying the target data object from the auxiliary storage means to the primary storage means;

updating the inventory means to invalidate metadata identifying the target data object in the auxiliary storage means;

responsive to migration requests each comprising a request to copy a specified data object from the primary storage means to the auxiliary storage means, performing migration operations comprising:

determining whether the catalog contains an expedited access indicator associated with the specified data object;

if the catalog contains an expedited access indicator associated with the specified data object, determining whether restoration of a copy of the specified data from the auxiliary storage means is possible, and if restoration is not possible, performing a full migration comprising copying contents of the specified data object from the primary storage means to the auxiliary storage means;

if restoration is possible, performing a shortcut migration comprising updating the inventory to restore invalidated metadata identifying the specified data object in the auxiliary storage means without copying the specified data object from the primary storage means to the auxiliary storage means; and if the catalog does not contain an expedited access indicator associated with the specified data object, copying content of the specified data object from the primary storage means to the auxiliary storage means.

* * * * *